(12) United States Patent
Kaufhold et al.

(10) Patent No.: US 6,552,153 B1
(45) Date of Patent: Apr. 22, 2003

(54) THERMOPLASTIC RESINS HAVING INCORPORATED MOLD RELEASE AGENTS

(75) Inventors: Wolfgang Kaufhold, Köln (DE); Friedemann Müller, Neuss (DE); Wolfgang Bräuer, Leverkusen (DE); Hans-Georg Hoppe, Leichlingen (DE); Hans-Georg Wussow, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/357,272

(22) Filed: Jul. 20, 1999

Related U.S. Application Data

(63) Continuation-in-part of application No. 09/005,297, filed on Jan. 9, 1998, now abandoned.

(30) Foreign Application Priority Data

Jan. 17, 1997 (DE) .......................... 197 01 490

(51) Int. Cl.[7] .................... C08G 18/62; C08G 18/48; C08G 18/32; C08K 5/05
(52) U.S. Cl. .................... 528/49; 524/379; 524/385; 524/386; 524/389; 524/765; 524/766; 528/75; 528/76; 528/80; 528/84; 528/85
(58) Field of Search .................... 524/379, 385, 524/386, 389, 765, 766; 528/49, 76, 80, 84, 85, 75

(56) References Cited

U.S. PATENT DOCUMENTS

| | | | |
|---|---|---|---|
| 3,925,527 A | 12/1975 | Kleimann et al. | ............. 264/53 |
| 4,201,847 A | 5/1980 | Kleimann et al. | ........... 521/172 |
| 4,254,228 A | 3/1981 | Kleimann et al. | ........... 521/128 |
| 4,594,402 A | 6/1986 | Coleman et al. | ............. 528/49 |
| 4,609,682 A | 9/1986 | Weber et al. | ................ 521/117 |
| 4,889,908 A | 12/1989 | Franke et al. | ................ 521/115 |
| 5,079,270 A * | 1/1992 | Burkhart et al. | ............. 521/117 |
| 5,919,976 A * | 7/1999 | Lee et al. | .................... 562/120 |

FOREIGN PATENT DOCUMENTS

| | | |
|---|---|---|
| CA | 2114874 | 8/1994 |
| EP | 732349 | 9/1996 |

* cited by examiner

Primary Examiner—Rabon Sergent
(74) Attorney, Agent, or Firm—Joseph C. Gil; Aron Preis; John E. Mrozinski, Jr.

(57) ABSTRACT

A mixture of hydroxy-terminated hydrocarbons useful as a mold release agent for polymers is disclosed. The polymers suitable in the present context are the ones prepared by polyaddition or polycondensation, in particular, thermoplastic polyurethane and polyurethane urea.

9 Claims, No Drawings

THERMOPLASTIC RESINS HAVING INCORPORATED MOLD RELEASE AGENTS

This application is a Continuation-In-Part of U.S. Ser. No. 09/005,297, filed Jan. 9, 1998, abandoned.

A mixture of hydroxy-terminated hydrocarbons useful as a mold release agent for polymers is disclosed. The polymers suitable in the present context are the ones prepared by polyaddition or polycondensation, in particular, thermoplastic polyurethane and polyurethane urea.

The invention relates to thermoplastic polyurethanes having incorporated mold release agents. Mixtures of specific hydroxyl-terminating hydrocarbons are used as incorporable mold release agents.

It is necessary with many processes for producing plastics moldings to add to the plastics compositions lubricants or mold release agents to prevent adherence of the moldings to the mold wall and so improve formability and processability. The addition of mold release agents is indispensable in particular for the processing of thermoplastic polyurethanes or polyurethane ureas.

When producing moldings from polyurethanes, fatty acid derivatives are generally used as so-called "internal" release agents, that is to say they are contained in the molding composition. Such "internal" release agents for polyurethanes are described, for example, in DE-OS 23 07 589 and DE-OS 23 19 648. In use, the latter release agents have the disadvantage that after a few molding cycles the mold is observed to be contaminated with mold release agent which has bled through, necessitating interruption of the process.

The releasing effect of the release agents naturally takes place only at the product surface, to which they migrate more or less rapidly as a result of their incompatibility with the polyurethane. The releasing effect generally improves as the release agent content increases, with the possibility of higher concentrations leading to an undesirable grey bloom at the product surface, which becomes more pronounced during protracted storage. Where polyurethane granules have been stored for long periods before being further processed, the release agent concentration at their surface may become so high that an extruder may fail to take the product uniformly. Moreover, the release agent concentration at the surface in the freshly produced molding is low, such that the only effect of a large proportion of the added release agent is to form undesirable bloom. In the production of composite materials, exuded release agent may under some circumstances impair the other components of the materials.

Migration and hence exudation of mold release agents can be prevented if constituents which have a demolding effect are incorporated in the polymer. In DE-OS 34 36 163 condensation products of ricinoleic acid with glycols, and in EP-A 310 895 specific polyether polyols, are used as incorporable mold release agents. These incorporable release agents, however, either have a less pronounced releasing effect than conventional mold release agents or are not available commercially.

It has now been found that mixtures of specific hydroxyl-terminating hydrocarbons are highly suitable as incorporable mold release agents for thermoplastic polyurethanes and polyurethane ureas.

The present invention provides thermoplastic polyurethanes prepared by reacting the components
A) organic diisocyanate,
B) linear hydroxyl-terminating polyol having an average molecular weight $M_n$ of 500 to 5000 g/mol,
C) diol or diamine chain extender having an average molecular weight $M_n$ of 60 to 450 g/mol,
D) from 0.5 to 10 wt. %, with reference to the total product, of a mixture prepared from
  a) 30≦x≦95 wt. % of hydroxyl-terminating hydrogenated polybutadiene of the formula (I)

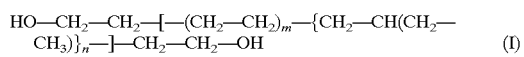

wherein the ratio m/n may be from 3:1 to 1.33:1, having an average molecular weight $M_n$ of 1000 to 10000 g/mol, a functionality of from 1.9 to 2.0 and a polymolecularity index $M_w/M_n$ of from 0.8 to 1.4,
  b) 0≦y≦70 wt. % of hydroxyl-terminating hydrogenated polybutadiene of the formula (II)

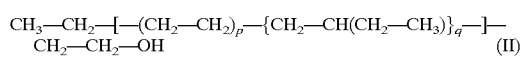

wherein the ratio p/q may be from 3:1 to 1.33:1, having an average molecular weight $M_n$ of 500 to 10000 g/mol, a functionality of from 0.9 to 1.0 and a polymolecularity index $M_w/M_n$ of from 0.8 to 1.4,
  c) 0≦z≦70 wt. % of hydroxyl-terminating block copolymer prepared from polyisoprene and poly(co-ethylene-butylene-styrene), having a styrene unit content of approximately 40 wt. %, an average molecular weight $M_n$ of 500 to 10000 g/mol, a functionality of from 0.9 to 1.0 and a polymolecularity index $M_w/M_n$ of from 0.8 to 1.4, and a ratio ethylene/butylene in the range of 3:1 to 1.33:1, having 5≦(y+z)≦70, wherein the molar ratio of the NCO groups in A) to the groups capable of reacting with isocyanate in B), C) and D) is from 0.9 to 1.2.

Aliphatic, cycloaliphatic, araliphatic, heterocyclic and aromatic diisocyanates such as are described in Justus Liebigs Annalen der Chemie [Annals of Chemistry], 562, pp. 75–136, are, for example, considered as organic diisocyanates A).

The following may be named as individual examples: aliphatic diisocyanates such as hexamethylene diisocyanate, cycloaliphatic diisocyanates such as isophorone diisocyanate, 1,4-cyclohexane diisocyanate, 1-methyl-2,4-cyclohexane diisocyanate and 1-methyl-2,6-cyclohexane diisocyanate, and the corresponding isomer mixtures, 4,4'-dicyclohexylmethane diisocyanate, 2,4'-dicyclohexylmethane diisocyanate and 2,2'-dicyclohexylmethane diisocyanate, and the corresponding isomer mixtures, aromatic diisocyanates such as 2,4-tolylene diisocyanate, mixtures of 2,4-tolylene diisocyanate and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and 2,4'-diphenylmethane diisocyanates, 4,4'-diisocyanato diphenylethane-(1,2) and 1,5-naphthalene diisocyanate. The following are preferably used: 1,6-hexamethylene diisocyanate, isophorone diisocyanate, dicyclohexylmethane diisocyanate, diphenylmethane diisocyanate isomer mixtures having a 4,4'-diphenylmethane diisocyanate content of >96 wt. % and in particular 4,4'-diphenylmethane diisocyanate and 1,5-naphthalene diisocyanate. The diisocyanates named may be used in either single or intermixed manner. They may also be used together with up to 15 wt. % (with reference to the total quantity of diisocyanate) of a polyisocyanate, for example triphenylmethane-4,4',4"-triisocyanate or polyphenyl polymethylene polyisocyanates.

As component B), linear hydroxyl-terminating polyols having an average molecular weight $M_n$ of 500 to 5000 g/mol are used. These frequently contain small quantities of non-linear compounds by reason of their production process. For this reason reference is also commonly to "substantially linear polyols". Polyester diols, polyether diols, polycarbonate diols or mixtures thereof are preferred.

Suitable polyether diols may be prepared by reacting one or more alkylene oxides having 2 to 4 carbon atoms in the alkylene radical with an initiator molecule containing two bonded active hydrogen atoms. Examples of alkylene oxides which may be named are ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably used. The alkylene oxides may be used singly, alternately or as mixtures. Examples of initiator molecules which are considered are water, aminoalcohols such as N-alkyl diethanolamines, for example N-methyl diethanolamine, and diols such as ethylene glycol, 1,3-propylene glycol, 1,4-butanediol and 1,6-hexanediol. Mixtures of initiator molecules may optionally also be used. Suitable polyether diols are furthermore the hydroxyl group-containing polymerization products of tetrahydrofuran. Trifunctional polyethers may also be used in quantities of from 0 to 30 wt. %, with reference to the bifunctional polyethers, the maximum quantity whereof being, however, such that a product results which is thermoplastically processable. The substantially linear polyether diols have average molecular weights $M_n$ of 500 to 5000 g/mol. They may be used both in single and intermixed manner.

Suitable polyester diols may, for example, be prepared from dicarboxylic acids having 2 to 12 carbon atoms, preferably 4 to 6 carbon atoms, and polyhydric alcohols. Examples of dicarboxylic acids which are considered are aliphatic dicarboxylic acids such as succinic acid, glutaric acid, adipic acid, suberic acid, azelaic acid and sebacic acid, and aromatic dicarboxylic acids such as phthalic acid, isophthalic acid and terephthalic acid. The dicarboxylic acids may be used singly or as mixtures, for example in the form of a succinic, glutaric and adipic acid mixture. It may optionally be advantageous for preparing the polyester diols to use instead of the dicarboxylic acids the corresponding dicarboxylic acid derivatives such as carboxylic acid diesters having 1 to 4 carbon atoms in the alcohol radical, carboxylic acid anhydrides or carboxylic acid chlorides. Examples of polyhydric alcohols are glycols having 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the desired properties, the polyhydric alcohols may be used alone or optionally in mixture together. Esters of carbonic acid with the named diols, in particular those such as have 4 to 6 carbon atoms, such as 1,4-butanediol or 1,6-hexanediol, condensation products of hydroxycarboxylic acid, for example hydroxyhexanoic acid and polymerization products of lactones, for example optionally substituted caprolactones, are furthermore suitable. Ethanediol polyadipates, 1,4-butanediol polyadipates, ethanediol-1,4-butanediol polyadipates, 1,6-hexane neopentyl glycol polyadipates, 1,6-hexanediol-1,4-butanediol polyadipates and polycaprolactones are preferably used as polyester diols. The polyester diols have average molecular weights $M_n$ of 500 to 5000 g/mol and may be used in either single or intermixed manner.

Diols having a molecular weight of 60 to 450 g/mol or diamines having a molecular weight of 60 to 500 g/mol are used as chain extenders C), preferably aliphatic diols having 2 to 14 carbon atoms, such as, for example, ethanediol, 1,6-hexanediol, diethylene glycol, dipropylene glycol and in particular 1,4-butanediol. However, diesters of terephthalic acid with glycols having 2 to 4 carbon atoms, such as, for example, terephthalic acid bis(ethylene glycol) or terephthalic acid bis(1,4-butanediol), hydroxyalkylene ethers of hydroquinone, such as, for example, 1,4-di(hydroxyethyl) hydroquinone, ethoxylated bisphenols, (cyclo)aliphatic diamines such as, for example, isophoronediamine, ethylenediamine, 1,2-propylenediamine, 1,3-propylenediamine, N-methylpropylene-1,3-diamine, N,N'-dimethyl ethylenediamine, and aromatic diamines, such as, for example, 2,4-tolylenediamine and 2,6-tolylenediamine, 3,5-diethyl-2,4-tolyenediamine and 3,5-diethyl-2,6-tolylenediamine and primary mono-, di-, tri- or tetraalkyl-substituted 4,4'-diaminodiphenylmethanes, are, however, also suitable. Mixtures of the aforementioned chain extenders may also be used. Smaller quantities of triols may also be added.

Furthermore, small quantities of conventional monofunctional compounds may also be used, for example as chain terminators or demolding aids. Examples which may be named are alcohols such as octanol and stearyl alcohol or amines such as butylamine and stearylamine.

According to the invention, the thermoplastic polyurethanes contain as component D) from 0.5 to 10 wt. %, preferably from 1 to 5 wt. %, with reference to the total product, of a mixture prepared from a) $30 \leq x \leq 95$ wt. % of hydroxyl-terminating hydrogenated polybutadiene of the formula (I)

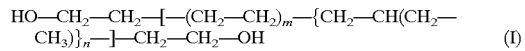
(I)

wherein the ratio m/n may be from 3:1 to 1.33:1, having an average molecular weight $M_n$ of 1000 to 10000 g/mol, a functionality of from 1.9 to 2.0 and a polymolecularity index $M_w/M_n$ of from 0.8 to 1.4, b) $0 \leq y \leq 70$ wt. % of hydroxyl-terminating hydrogenated polybutadiene of the formula (II)

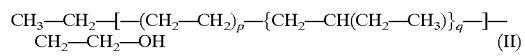
(II)

wherein the ratio p/q may be from 3:1 to 1.33:1, having an average molecular weight $M_n$ of 500 to 10000 g/mol, a functionality of from 0.9 to 1.0 and a polymolecularity index $M_w/M_n$ of from 0.8 to 1.4, c) $0 \leq z \leq 70$ wt. % of hydroxyl-terminating block copolymer prepared from polyisoprene and poly(co-ethylene-butylene-styrene), having a styrene unit content of approximately 40 wt. %, an average molecular weight $M_n$ of 500 to 10000 g/mol, a functionality of from 0.9 to 1.0 and a polymolecularity index $M_w/M_n$ of from 0.8 to 1.4, having $5 \leq (y+z) \leq 70$, wherein the molar ratio of the NCO groups in A) to the groups capable of reacting with isocyanate in B), C) and D) is from 0.9 to 1.2.

Such mixtures may also be used in other polymers as incorporable mold release agents. The invention therefore also provides the use of the aforementioned mixtures of hydroxyl-terminating hydrocarbons as mold release agents in polymers which can be prepared by polyaddition or polycondensation, for example polyamides, polycarbonates or polyalkylene terephthalates, in particular polyurethanes and polyurethane ureas.

In order to prepare the thermoplastic polyurethanes according to the invention, the structural components, optionally in the presence of catalysts, auxiliary agents and additives, are reacted in quantities such that the equivalence ratio of NCO groups to the total NCO-reactive groups, in particular the OH groups of the low molecular weight diols/triols and polyols and the $NH_2$ groups of the low molecular weight amines, respectively, is from 0.9:1.0 to 1.2:1.0, preferably from 0.95:1.0 to 1.10:1.0.

Suitable catalysts for preparing the thermoplastic polyurethanes according to the invention are known in principle. Examples are tertiary amines such as, for example, triethylamine, dimethylcyclohexylamine, N-methylmorpholine, N,N'-dimethylpiperazine, 2-(dimethylaminoethyoxy)ethanol, diazabicyclo-(2,2,2) octane, or also organic metal compounds such as titanic acid esters, iron compounds, tin compounds, for example tin diacetate, tin dioctoate, tin dilaurate or the tin dialkyl salts of aliphatic carboxylic acids, such as dibutyltin diacetate, dibutyltin dilaurate or the like. Preferred catalysts are organic metal compounds, in particular titanic acid esters, iron compounds or tin compounds.

Other auxiliary agents and additives may also be added when preparing the thermoplastic polyurethanes according to the invention. Examples which may be named are anti-blocking agents, inhibitors, stabilizers against degradation due to hydrolysis, light and heat and against discoloration, flame retardants, dyes, pigments, inorganic or organic fillers and reinforcing agents. Reinforcing agents are in particular fibrous reinforcements such as inorganic fibers prepared according to the prior art, which may also be sized. More detail concerning the named auxiliary substances and additives can be found in the specialist literature, for example in J. H. Saunders, K. C. Frisch: "High Polymers", Vol. XVI, Polyurethane, Part 1 and 2, Interscience Publishers 1962 and 1964, in R. Gächter, H. Müller (Ed.): Taschenbuch der Kunststoff-Additive [Manual of Plastics Additives], 3rd edition, Hanser Verlag, Munich 1989, or in DE-A 29 01 774.

The thermoplastic polyurethanes according to the invention may be prepared by processes which are known in principle, for example in the so-called extrusion process, for example in a multi-screw extruder. The components may be dispensed simultaneously, that is to say in the one-shot process, or sequentially, that is to say by a prepolymer process. Here, the prepolymer may either, for batch-wise operation be placed in, or, for continuous operation be prepared in, a section of the extruder or in a separate prepolymer unit which is installed upstream.

The invention is further illustrated but is not intended to be limited by the following examples in which all parts and percentages are by weight unless otherwise specified.

EXAMPLES

Preparation of the TPU

In all the examples, the ratio of NCO groups to the total isocyanate-reactive groups in the polyol, the mold release agent and the chain extender was 1:1; the polyol and the chain extender were used in a molar ratio of 1:2.65.

In a reaction vessel MDI, a polyester polyol based on adipic acid and 1,4-butanediol, having an average molecular weight $M_n$ of 2250, and the corresponding mold release agent (see Table 1, quantities are in wt. %) were reacted at 120° C. until all the polyol was converted; the theoretical NCO index was reached within 20–30 minutes in the experiments. 1,4-Butanediol was then added as the chain extender, with stirring. After 30 to 60 seconds, the reaction mixture was poured onto a coated metal sheet and was conditioned at 100° C. for 1 hour. Moldings were produced from the granulated product on an injection molding machine.

The following were used as mold release agents:
1. Fafty acid amide (Loxamid® EBS, from Henkel KGaA, Düsseldorf)
2. Hydroxyl-terminating hydrogenated polybutadiene diol having $M_n$=3400 g/mol (Kraton® Liquid HPVM 2203, from Shell AG)
3. Hydroxyl-terminating hydrogenated polybutadiene monool having $M_n$=4200 g/mol (Kraton® Liquid HPVM 1203, from Shell AG)
4. Hydroxyl-terminating block copolymer prepared from isoprene, butylene and styrene, containing approximately 40 wt. % styrene units and having $M_n$=6000 g/mol (Kraton® Liquid HPVM 1301, from Shell AG)

Sample testing

Demolding Behavior

The releasing effect on demolding the sample moldings from the injection molding machine was evaluated and was classed using the following system:

1=drops out of the mold unaided,
2=is easily removed from the mold,
3=is difficult to remove from the mold.

It can be seen that comparable demolding behavior results when the release agents according to the invention are substituted for Loxamid® EBS. The extra addition of Loxamid® EBS does not improve the demolding behavior.

Migration:

To test for this, injection-molded plates are stored for 1 week at constant temperature (room temperature, 60° C., 80° C.). The surface of the plates is then examined for signs of exudation, and the results are classed on the following scale:

0=no exudation
1=slight exudation
2=moderate exudation
3=pronounced exudation

It can be seen that there is no exudation when the release agents according to the invention are used exclusively.

| | | | Migration (1 week) | | |
|---|---|---|---|---|---|
| No. | Mold Release Agent | Demolding Behavior | Room temp. | 60° C. | 80° C. |
| 1 | 0.4% Loxamid EBS | 2 | 1 | 3 | 3 |
| 2 | 0.5% HPVM 2203 0.5% HPVM 1203 | 2 | 0 | 0 | 0 |
| 3 | 0.5% HPVM 2203 0.5% HPVM 1203 0.4% Loxamid EBS | 2 | 0 | 2 | 2 |
| 4 | 0.5% HPVM 2203 0.5% HPVM 1301 | 2 | 0 | 0 | 0 |
| 5 | 0.5% HPVM 2203 0.5% HPVM 1301 0.4% Loxamid EBS | 2 | 0 | 2 | 2 |

Although the invention has been described in detail in the foregoing for the purpose of illustration, it is to be understood that such detail is soley for that purpose and that variations can be made therein by those skilled in the art without departing from the spirit and scope of the invention except as it may be limited by the claims.

What is claimed is:
1. A thermoplastic polyurethane prepared by reacting
A) an organic diisocyanate,
B) at least one linear hydroxyl-terminating polyol having an average molecular weight $M_n$ of 500 to 5,000 g/mol, selected from the group consisting of polyester diols, polyether diols and polycarbonate diol,

C) a chain extender selected from the group consisting of (i) and (ii) wherein (i) is a diamine having an average molecular weight $M_n$ of 60 to 500 g/mol and wherein (ii) is a member having a number average molecular weight of 60 to 450 g/mol, selected from the group consisting of diols having 2 to 14 carbon atoms, diesters of terephthalic acid with glycols having 2 to 4 carbon atoms, hydroxyalkylene ether of hydroquinone and ethoxylated bisphenol, and, D) from 0.5 to 10 wt. %, with reference to the weight of the total product, of a mixture prepared from a) $30 \leq x \leq 95$ wt. % relative to the weight of the mixture of a hydroxyl-terminating hydrogenated polybutadiene of the formula (I)

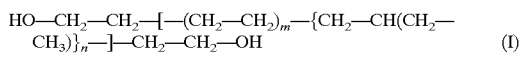

wherein the ratio m/n is from 3:1 to 1.33:1, having an average molecular weight $M_n$ of 1000 to 10,000 g/mol, a functionality of from 1.9 to 2.0 and a polymolecularity index $M_w/M_n$ of from 0.8 to 1.4, b) $0 \leq y \leq 70$ wt. % relative to the weight of the mixture of a hydroxyl-terminating hydrogenated polybutadiene of the formula (II)

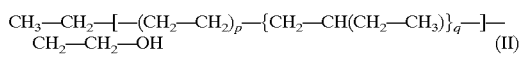

wherein the ratio p/q is from 3:1 to 1.33:1, having an average molecular weight $M_n$ of 500 to 10,000 g/mol, a functionality of from 0.9 to 1.0 and a polymolecularity index $M_w/M_n$ of from 0.8 to 1.4, c) $0 \leq z \leq 70$ wt. % relative to the weight of the mixture of hydroxyl-terminating block copolymer prepared from polyisoprene and poly(co-ethylene-butylene-styrene), having a styrene unit content of approximately 40 wt. %, an average molecular weight $M_n$ of 500 to 10,000 g/mol, a functionality of from 0.9 to 1.0 and a polymolecularity index $M_w/M_n$ of from 0.8 to 1.4, and a molar ratio ethylene/butylene in the range of 3:1 to 1.33:1, wherein 5 wt. % $\leq (y+z) \leq 70$ wt. %, wherein the molar ratio of the NCO groups in A) to the groups capable of reacting with isocyanate in B), C) and D) is from 0.9 to 1.2 and wherein the sum of a), b) and c) totals 100 wt. %.

2. In the process of preparing a thermoplastic polyurethane resin by polyaddition reaction, the improvement comprising introducing into the reaction a mold release mixture comprising a) 30 to 95 percent of a hydroxyl-terminated hydrogenated polybutadiene of the formula (I)

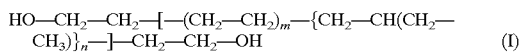

having a number average molecular weight of 1000 to 10,000 g/mol, a functionality of 1.9 to 2.0, an index of $M_w/M_n$ of 0.8 to 1.4, and a ratio m/n in the range of 3:1 to 1.33:1, b) 0 to 70 percent of a hydroxyl-terminated hydrogenated polybutadiene of the formula (II)

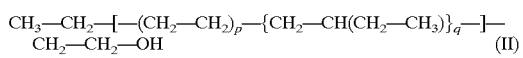

having a number average molecular weight of 500 to 10,000 g/mol, a functionality of 0.9 to 1.0, an index of $M_w/M_n$ of 0.8 to 1.4, and a ratio p/q in the range of 3/1 to 1.33/1, and c) 0 to 70 percent of hydroxyl-terminated block copolymer of polyisoprene and poly(co-ethylene-butylene-styrene), having a styrene content of about 40 percent relative to the weight of c), a number average molecular weight of 500 to 10,000 g/mol, a functionality of 0.9 to 1.0, an index of $M_w/M_n$ of 0.8 to 1.4, and a molar ratio ethylene/butylene in the range of 3:1 to 1.33:1, and provided that $5 \leq (b+c) \leq 70$ percent, with said percent being relative to the total weight of a)+b)+c).

3. The process of claim 2, wherein component b comprises 0 percent of the mold release mixture.

4. The process of claim 2, wherein component c comprises 0 percent of the mold release mixture.

5. A thermoplastic polyurethane resin having improved mold releasing properties prepared by introducing a mold release mixture into a reaction mixture for the making of said thermoplastic polyurethane, said mold release mixture comprising a) 30 to 95 percent of a hydroxyl-terminated hydrogenated polybutadiene of the formula (I)

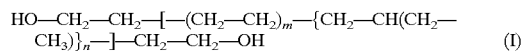

having a number average molecular weight of 1000 to 10,000 g/mol, a functionality of 1.9 to 2.0, an index of $M_w/M_n$ of 0.8 to 1.4, and a ratio m/n in the range of 3:1 to 1.33:1, b) 0 to 70 percent of a hydroxyl-terminated hydrogenated polybutadiene of the formula (II)

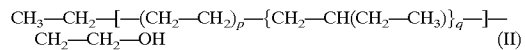

having a number average molecular weight of 500 to 10,000 g/mol, a functionality of 0.9 to 1.0, an index of $M_w/M_n$ of 0.8 to 1.4, and a ratio p/q in the range of 3/1 to 1.33/1, and c) 0 to 70 percent of hydroxyl-terminated block copolymer of polyisoprene and poly(co-ethylene-butylene-styrene), having a styrene content of about 40 percent relative to the weight of c), a number average molecular weight of 500 to 10,000 g/mol, a functionality of 0.9 to 1.0, an index of $M_w/M_n$ of 0.8 to 1.4, and a molar ratio ethylene/butylene in the range of 3:1 to 1.33:1, provided that $5 \leq (b+c) \leq 70$ percent, with said percent being relative to the total weight of a)+b)+c) and wherein said improved properties are set in comparison to a corresponding resin in the preparation of which said mold release mixture has not been introduced.

6. The thermoplastic polyurethane resin of claim 5, wherein component b comprises 0 percent of the mold release mixture.

7. The thermoplastic polyurethane resin of claim 5, wherein component c comprises 0 percent of the mold release mixture.

8. A thermoplastic polyurethane prepared by reacting

A) an organic diisocyanate,

B) at least one linear hydroxyl-terminating polyol having an average molecular weight $M_n$ of 500 to 5,000 g/mol, selected from the group consisting of polyester diols, polyether diols and polycarbonate diol, C) a chain extender selected from the group consisting of (i) and (ii) wherein (i) is a diamine having an average molecular weight $M_n$ of 60 to 500 g/mol and wherein (ii) is a member having a number average molecular weight of 60 to 450 g/mol, selected from the group consisting of diols having 2 to 14 carbon atoms, diesters of terephthalic acid with glycols having 2 to 4 carbon atoms, hydroxyalkylene ether of hydroquinone and ethoxylated bisphenol, and, D) from 0.5 to 10 wt. %, with reference to the weight of the total product, of a mixture prepared from a) 30 to 95 wt. % relative to the weight of the mixture of a hydroxyl-terminating hydrogenated polybutadiene of the formula (I)

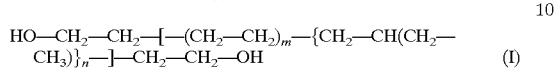  (I)

wherein the ratio m/n is from 3:1 to 1.33:1, having an average molecular weight $M_n$ of 1000 to 10,000 g/mol, a functionality of from 1.9 to 2.0 and a polymolecularity index $M_w/M_n$ of from 0.8 to 1.4, and b) 5 to 70 wt. % relative to the weight of the mixture of a hydroxyl-terminating hydrogenated polybutadiene of the formula (II)

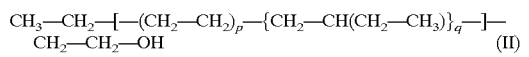  (II)

wherein the ratio p/q is from 3:1 to 1.33:1, having an average molecular weight $M_n$ of 500 to 10,000 g/mol, a functionality of from 0.9 to 1.0 and a polymolecularity index $M_w/M_n$ of from 0.8 to 1.4, wherein the molar ratio of the NCO groups in A) to the groups capable of reacting with isocyanate in B), C) and D) is from 0.9 to 1.2 and wherein the sum of a) and b) totals 100 wt. %.

9. A thermoplastic polyurethane prepared by reacting

A) an organic diisocyanate,

B) at least one linear hydroxyl-terminating polyol having an average molecular weight $M_n$ of 500 to 5,000 g/mol, selected from the group consisting of polyester diols, polyether diols and polycarbonate diol, C) a chain extender selected from the group consisting of (i) and (ii) wherein (i) is a diamine having an average molecular weight $M_n$ of 60 to 500 g/mol and wherein (ii) is a member having a number average molecular weight of 60 to 450 g/mol, selected from the group consisting of diols having 2 to 14 carbon atoms, diesters of terephthalic acid with glycols having 2 to 4 carbon atoms, hydroxyalkylene ether of hydroquinone and ethoxylated bisphenol, and, D) from 0.5 to 10 wt. %, with reference to the weight of the total product, of a mixture prepared from a) 30 to 95 wt. % relative to the weight of the mixture of a hydroxyl-terminating hydrogenated polybutadiene of the formula (I)

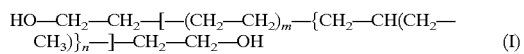  (I)

wherein the ratio m/n is from 3:1 to 1.33:1, having an average molecular weight $M_n$ of 1000 to 10,000 g/mol, a functionality of from 1.9 to 2.0 and a polymolecularity index $M_w/M_n$ of from 0.8 to 1.4, and b) 5 to 70 wt. % relative to the weight of the mixture of hydroxyl-terminating block copolymer prepared from polyisoprene and poly(co-ethylene-butylene-styrene), having a styrene unit content of approximately 40 wt. %, an average molecular weight $M_n$ of 500 to 10,000 g/mol, a functionality of from 0.9 to 1.0 and a polymolecularity index $M_w/M_n$ of from 0.8 to 1.4, and a molar ratio ethylene/butylene in the range of 3:1 to 1.33:1, wherein the molar ratio of the NCO groups in A) to the groups capable of reacting with isocyanate in B), C) and D) is from 0.9 to 1.2 and wherein the sum of a) and b) totals 100 wt. %.

* * * * *